Feb. 2, 1932.  O. CZEIJA ET AL  1,843,708

APPARATUS FOR REPRODUCING SOUNDS RECORDED ON FILMS

Filed March 15, 1930

INVENTORS
OSKAR CZEIJA
LEOPOLD RICHTERA
HANS THIRRING
by
Attorney

Patented Feb. 2, 1932

1,843,708

UNITED STATES PATENT OFFICE

OSKAR CZEIJA, LEOPOLD RICHTERA, AND HANS THIRRING, OF VIENNA, AUSTRIA, ASSIGNORS TO SELENOPHON LICHT- UND TONBILDGESELLSCHAFT M. B. H., OF VIENNA, AUSTRIA, A COMPANY OF AUSTRIA

APPARATUS FOR REPRODUCING SOUNDS RECORDED ON FILMS

Application filed March 15, 1930, Serial No. 436,078, and in Austria March 27, 1929.

Our invention relates to an apparatus for reproducing sounds recorded on films in which the film itself is opaque and consists, for instance, of a paper copy of the sound film negative. Reproducing apparatus of this kind have been proposed in which the light reflected from the opaque film falls upon a cell sensitive to light; this cell is connected through the medium of an amplifier to a telephone or loud speaker in the same manner as is usual with transparent films. In this case there arise the same difficulties as in the case of exhibiting kinematographic pictures on opaque films since the intensity of the light reflected from the opaque film is much smaller than that of light passing through a transparent film. This makes it necessary to employ a considerably greater electric amplification than in the case of a transparent film for obtaining the same intensity of sound. Owing to this fact sound films on paper have not been used up to now on a commercial scale, although they are known since about ten years.

The present invention avoids the drawback of the low intensity of light in the reproduction of opaque sound films or in the equiscopic reproduction by so arranging the reproduction apparatus that the light available is utilized in the most economical manner possible.

The essential features of the present invention consist substantially of an advantageous arrangement of the surface sensitive to light and in the use of a special kind of cells sensitive to light, the properties of which permit of arranging the parts in the manner hereinafter set forth.

Figure 1:
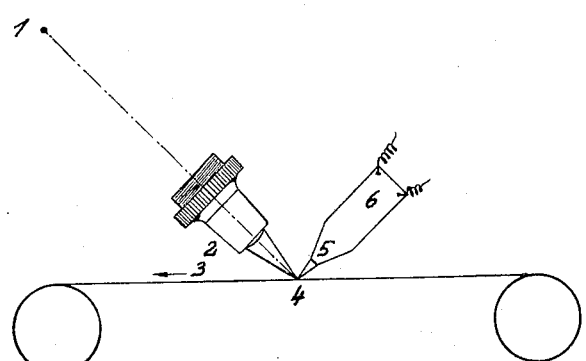

Fig. 1 is a diagrammatical side elevation of the present apparatus and

Figure 2:
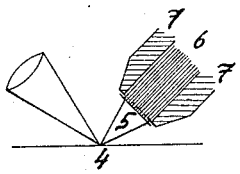

Fig. 2 is a similar view of a slightly modified arrangement serving the same purpose. 1 is a linear source of light perpendicular to the plane of the drawings. It may either consist of a rectilinear incandescent filament or of an intensely illuminated small slot. 2 is a microscope objective focussing onto the film 3 a real image 4 of the source of light 1, such image being on a greatly reduced scale. 5 is the active surface of a cell sensitive to light 6. This method of illuminating the film by a very small band of light arranged as just described is well known in connection with transparent sound films, this method is also made use of in the telegraphic transmissions of pictures in which a small intensly illuminated area is caused to move over the surface of the picture, light reflected therefrom being thrown on a cell sensitive to light and affecting the same. In all the arrangements of this kind heretofore known the distance between the illuminated surface and the surface sensitive to light is of the order of centimeters and the area of the surface sensitive to light is of the order of one or even several square centimeters. As distinguished from these dimensions heretofore used we now use according to our invention a cell sensitive to light, preferably a selenium cell, having only a very small active surface say, for instance, 1 x 4 millimeters which can be brought into very close proximity to the line illuminated. Consequently the cell sensitive to light receives the rays of light emitted from the illuminated line of the film in a very small field with exceedingly great intensity which, as has been found by experience, secures a very satisfactory efficiency of the reproduction.

The cells to be used in connection with this method must have firstly an adequately small active surface and secondly they must be so constructed that their frame does not intercept the pencil of light used for illuminating the sound track. The first condition excludes all types of selenium cells in which the system of supply conductors consists of two wires suitably wound since in such cells the surface sensitive to light must have larger dimensions than those above indicated in order that its conductivity may answer the purpose. The same applies to alcali photo cells the use of which would besides be prohibited by the dimensions of the glass bulb. Hence of the selenium cells at present known there remains only the selenium cell of the condenser type and the so called engraved selenium cells. In the former the system of supply conductors consists of two series of metal plates arranged in the manner of a plate condenser, these two series of plates being insulated from each other by mica sheets. These plates being set on edge are properly ground at the active surface of the cell and to the ground surface the selenium patch is applied which establishes the electric connection between the two series of metal plates. The so called engraved selenium cells consist of a metal coating applied to an insulating plate and the said metal coating being divided into two insulated parts by a zig zag shaped cut. These insulated parts constitute the electrodes of the selenium cell to which subsequently the selenium patch is applied.

Both of these types of selenium cells may be made of so small a size that they are suitable for the present purpose but the engraved selenium cells are open to the objection that the alternate currents set up in them by intermittent illumination if considerably amplified give rise to disturbing noises while, as experience has shown, selenium cells of the condenser type do not show this drawback.

For these reasons selenium cells of the condenser type are used in our apparatus for reproducing sounds recorded on a film, the frames holding together the metallic electrodes of these cells being suitably bevelled so that they border the active surface of the system of plates which carries the selenium patch only with a small edge. Fig. 2 shows a section through such cell on an enlarged scale. The rays of light emanating from the illuminated line 4 fall on the selenium surface 5 the electrodes of which are formed by the metal plates 6 perpendicular to the plane of the drawing and held together by the bevelled metal plates 7.

What we claim is:

1. Apparatus for reproducing sound tracks recorded on an opaque film comprising a selenium cell, a rectilinear source of light, an opaque film and means for producing a real image of the said rectilinear source of light on the film extending across the same, the selenium path of the said selenium cell being in the most intense part of the pencil of light emanating from the said line projected on the film, the distance between the selenium patch and the said projected line being less than two millimeters.

2. Apparatus for reproducing sound tracks recorded on an opaque film comprising a selenium cell, a rectilinear source of light, an opaque film and means for producing a real image of the said linear source of light on the film extending across the same, the selenium patch of the said selenium cell being in the most intense part of the pencil of light emanating from the said line projected on the film, the distance between the selenium patch and the said projected line being less than two millimeters, the said selenium cell being of the condenser type having metal framing members tapering towards the active surface of the selenium cell.

In testimony whereof we have affixed our signatures.

OSKAR CZEIJA.
LEOPOLD RICHTERA.
HANS THIRRING.